(12) United States Patent
Tamura et al.

(10) Patent No.: US 10,179,556 B2
(45) Date of Patent: Jan. 15, 2019

(54) CABLE HOLDING STRUCTURE

(71) Applicant: NTN CORPORATION, Osaka (JP)

(72) Inventors: Shiro Tamura, Shizuoka (JP); Youhei Imanishi, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/539,746

(22) PCT Filed: Dec. 25, 2015

(86) PCT No.: PCT/JP2015/086222
§ 371 (c)(1),
(2) Date: Jun. 26, 2017

(87) PCT Pub. No.: WO2016/111201
PCT Pub. Date: Jul. 14, 2016

(65) Prior Publication Data
US 2017/0369007 A1    Dec. 28, 2017

(30) Foreign Application Priority Data

Jan. 6, 2015   (JP) ................................ 2015-000969

(51) Int. Cl.
*B60R 16/02* (2006.01)
*H02G 3/04* (2006.01)
(Continued)

(52) U.S. Cl.
CPC ............ *B60R 16/0222* (2013.01); *B60K 7/00* (2013.01); *B60R 16/02* (2013.01);
(Continued)

(58) Field of Classification Search
CPC ...... H02G 3/0406; H02G 3/0616; H02G 3/22; H02G 3/32; H02G 15/013; H01B 17/08;
(Continued)

(56) References Cited

U.S. PATENT DOCUMENTS 2,963,536 A * 12/1960 Kokalas ............. H01R 13/5208
174/653
4,267,401 A * 5/1981 Wilkinson ........... H01B 17/308
174/151
(Continued)

FOREIGN PATENT DOCUMENTS

| EP | 1 985 502 | 10/2008 |
|---|---|---|
| EP | 2 055 535 | 5/2009 |
| GB | 579 100 | 7/1946 |
| JP | 11-69573 | 3/1999 |
| JP | 2005-271909 | 10/2005 |
| JP | 2007-196739 | 8/2007 |
| JP | 2009-106091 | 5/2009 |
| WO | 2016/043065 | 3/2016 |

OTHER PUBLICATIONS

English Machine Translation of Harada (JP2005-271909A).*
English Machine Translation of Kosaka (JPH11-69573).*

*Primary Examiner* — Chau N Nguyen
*Assistant Examiner* — Roshn Varghese
(74) *Attorney, Agent, or Firm* — Clark & Brody

(57) ABSTRACT

A cable holding structure includes: an elastic member (23) having through holes (23h) through which cables (18) are passed; and a fixing portion (21, 22) having openings (21h, 22h) through which the cables are inserted, and disposed on a vehicle body-side member (19) to fasten the elastic member. The cables inserted through the through holes are restrained by the elastic member subjected to a fastening force.

5 Claims, 3 Drawing Sheets

(51) Int. Cl.
*H02G 3/22* (2006.01)
*B60K 7/00* (2006.01)

(52) U.S. Cl.
CPC ....... *B60R 16/0215* (2013.01); *H02G 3/0406* (2013.01); *H02G 3/22* (2013.01)

(58) Field of Classification Search
CPC .............. H01R 13/639; B60R 16/0215; B60R 16/0222
USPC .... 174/77 R, 93, 151, 152 G, 153 G, 153 R, 174/155, 158 R, 480, 505, 544, 656, 657, 174/658
See application file for complete search history.

(56) References Cited

U.S. PATENT DOCUMENTS

| | | | | |
|---|---|---|---|---|
| 4,377,291 | A * | 3/1983 | Albertini | G02B 6/4471 277/619 |
| 6,039,324 | A * | 3/2000 | Santa, Jr. | H02G 15/013 174/92 |
| 6,521,840 | B1 * | 2/2003 | Kreutz | H02G 3/22 174/151 |
| 2004/0080119 | A1 * | 4/2004 | Goll | F16L 5/08 277/607 |
| 2007/0079969 | A1 | 4/2007 | Allenworth | |
| 2013/0014974 | A1 * | 1/2013 | Burke | G02B 6/4444 174/135 |

* cited by examiner

CABLE HOLDING STRUCTURE

TECHNICAL FIELD

The present invention relates to in-wheel motor drive devices that are placed inside wheels of passenger cars to drive the wheels, and more particularly relates to a structure that holds a cable extending from a vehicle body side to an in-wheel motor drive device.

BACKGROUND ART

Hybrid vehicles that use electric power and fuel to drive their wheels and electric vehicles, such as electric cars, which use only electric power to drive their wheels are known as passenger cars. For example, an in-wheel motor described in Japanese Unexamined Patent Application Publication No. 2005-271909 (Patent Literature 1) is known as an in-wheel motor that is placed in an internal space region of a wheel of an electric vehicle to drive the wheel. In the technique described in Patent Literature 1, a plurality of wires (electrical cables) are inserted and fixed in a wiring box of the in-wheel motor, and these wires are held by a wire clamp. The wire clamp can rotate about a kingpin and thus can restrain stress that is applied to the wires even when the in-wheel motor is displaced with respect to a suspension arm.

CITATION LIST

Patent Literatures

Patent Literature 1: Japanese Unexamined Patent Application Publication No. 2005-271909

SUMMARY OF INVENTION

Technical Problem

According to the technique of Patent Literature 1, even when the wires are bent due to, e.g., steering of the in-wheel motor, the wire clamp rotates according to the steering, thereby reducing bending stress that is applied to the wires. However, such a conventional in-wheel motor has the following problems. Since a part of the vehicle body which has the wires fixed thereto does not rotate according to displacement of the in-wheel motor, large bending stress may still be applied to the wires in this portion. Large bending stress may also be applied to the wires in a part of the in-wheel motor (the wiring box) which has the wires fixed thereto, when the in-wheel motor is steered to a maximum angle.

In view of the above circumstances, it is an object of the present invention to provide a technique of reducing bending stress that is applied to a cable at a position where the cable connected to an in-wheel motor drive device is fixed.

Solution to Problem

In order to achieve the above object, a cable holding structure according to the present invention includes: a cable extending from a vehicle body-side member to an in-wheel motor drive device attached to the vehicle body-side member so that the in-wheel motor drive device can move relative to the vehicle body-side member; an elastic member having a through hole through which the cable is passed; and a fixing portion having an opening through which the cable is passed, and disposed on the vehicle body-side member and/or the in-wheel motor drive device to fasten the elastic member. The cable passed through the through hole is restrained by the elastic member subjected to a fastening force.

According to this invention, since the cable is held by the elastically deformable elastic member at a position where the cable is fixed to the vehicle body-side member and/or a position where the cable is fixed to the in-wheel motor drive device, the cable can move slightly within the range allowed by the elastic member. Accordingly, even when the cable is bent and stretched, the cable itself moves slightly at its fixed position so as to reduce bending stress. The bending stress that is applied to the cable at its fixed position can thus be reduced. As used herein, the vehicle body-side member refers to a member that is attached on the vehicle body side as viewed from a member being described. Examples of the vehicle body-side member include a vehicle body and a suspension member as viewed from the in-wheel motor drive device, and the vehicle body as viewed from the suspension member.

The structure of the fixing portion that fastens the elastic member is not particularly limited. For example, the fixing portion includes a base part having the opening through which the cable is passed, and a fixing member attached and fixed to the base part. In an embodiment of the present invention, the base part and the fixing member face each other in a direction perpendicular to a direction in which the through hole extends, and clamp the elastic member in the direction perpendicular to the direction in which the through hole extends. According to this embodiment, the base part and the fixing member can be combined to fasten the elastic member so as to clamp the elastic member between the base part and the fixing member. This reduces the size of the sectional shape of the through hole formed in the elastic member, whereby the cable is restrained by the elastic member.

In another embodiment, the base part and the fixing member may face each other in a direction in which the through hole extends, and clamp the elastic member in the direction in which the through hole extends. According to this embodiment, the elastic member is compressed in the direction in which the through hole extends. This reduces the size of the sectional shape of the through hole formed in the elastic member, whereby the cable is restrained by the elastic member.

The shape of the opening is not particularly limited. The manner in which the elastic member is clamped in the direction in which the through hole extends is not particularly limited. In a preferred embodiment of the present invention, one of the base part and the fixing member has a tapered hole that receives the elastic member, and the elastic member has a columnar shape and is pressed into the tapered hole by the other of the base part and the fixing member. According to this embodiment, the elastic member is clamped so as to be pressed into the tapered hole, so that the cable can be restrained. Alternatively, in another embodiment, one of the base part and the fixing member may have a receiving hole that receives the elastic member, and the elastic member may have a tapered shape and may be pressed into the receiving hole by the other of the base part and the fixing member. According to this embodiment, the outside diameter of a thicker end of the elastic member having a tapered shape is larger than the inside diameter of the receiving hole, and the outside diameter of a thinner end of the elastic member is smaller than the inside diameter of the receiving hole. The thinner end is inserted into the receiving hole, and the thicker end of the elastic member is pressed into the receiving hole, whereby the elastic member is fastened by a hole wall surface of the receiving hole to restrain the cable. In still another embodiment, one of the base part and the fixing member may have a tubular hole having the same sectional shape along its length in the longitudinal direction, instead of the tapered hole.

When passing the cable through the opening of the fixing portion, a tip end of the cable may be inserted through the opening of the fixing portion. However, attachment of the cable is troublesome if the cable is long. Accordingly, the fixing portion preferably has a first cutout extending from the opening to an outer edge of the base part. In a preferred embodiment of the present invention, the base part has a first cutout extending from the opening to an outer edge of the base part, the fixing member has a second opening through which the cable is passed and a second cutout extending from the second opening to an outer edge of the fixing member, and the fixing member is attached and fixed to the base part such that the first cutout and the second cutout are located at different positions as viewed in the direction in which the through hole extends. According to this embodiment, the cable can be passed through the opening by pressing an intermediate portion of the cable into the first and second cutouts. It is therefore not necessary to insert the tip end of the cable through the opening, thereby saving labor for attachment of the cable.

When passing the cable through the through hole of the elastic member, the tip end of the cable may be inserted through the through hole of the elastic member. However, attachment of the cable is troublesome if the cable is long. In a preferred embodiment of the present invention, the elastic member has a slit extending from a hole wall surface of the through hole to a surface of the elastic member. According to this embodiment, the cable can be passed through the through hole by pressing an intermediate portion of the cable into the slit. It is therefore not necessary to insert the tip end of the cable through the through hole, thereby saving labor for attachment of the cable.

An intermediate portion of the cable may be fixed by a clamp member or may not be fixed by the clamp member. However, if the cable is long, the intermediate portion of the cable unintentionally flaps around. Accordingly, the intermediate portion of the cable is preferably fixed by the clamp member. In a preferred embodiment of the present invention, the vehicle body-side member includes a suspension device that allows the in-wheel motor drive device to be steered, and the cable holding structure further includes a clamp that holds the cable such that the cable crosses a steering axis of the in-wheel motor drive device. According to this embodiment, the cable is held at the steering axis where the influence of bending due to steering is the smallest. This can reduce bending stress that is applied to the cable. In the case where there are a plurality of cables, at least one of the cables is preferably held at such a position that the cable crosses the steering axis. In this case, the remainder of the cables is disposed so as to pass near the steering axis, whereby bending stress that is applied to the cables can be reduced.

Advantageous Effects of Invention

As described above, according to the present invention, bending stress that is applied to the cable at a position where the cable connected to the in-wheel motor drive device is fixed can be reduced. This improves durability of the cable and reduces the frequency of maintenance of the undercarriage of an electric vehicle.

DESCRIPTION OF EMBODIMENTS

Figure 1:
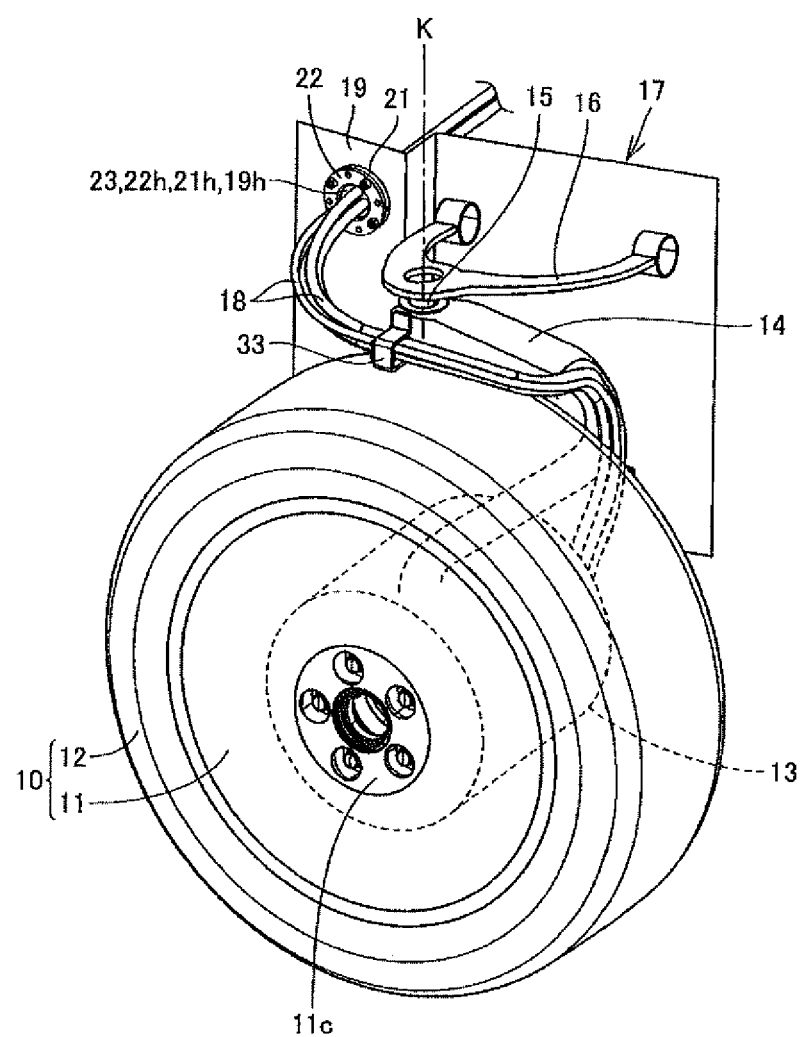
FIG. 1 is a perspective view of an embodiment of the present invention.

Embodiments of the present invention will be described in detail below based on the drawings. FIG. 1 is a perspective view of a cable holding structure according to an embodiment of the present invention. A wheel 10 of an electric vehicle includes a road wheel 11 made of a metal and a tire 12 made of rubber. The road wheel 11 has a cylindrical shape and an in-wheel motor drive device 13 is placed in the internal space of the road wheel 11. The in-wheel motor drive device 13 is coupled to a wheel hub 11c that is the center of the road wheel 11, and drives the wheel 10.

A knuckle arm 14 is formed integrally with a casing of the in-wheel motor drive device 13, as shown by dashed lines. The knuckle arm 14 extends from the upper part of the in-wheel motor drive device 13 and is bent so as to bypass the outer peripheral portion of the wheel 10. The upper end of the knuckle arm 14 is located above the in-wheel motor drive device 13 and the wheel 10 as shown by solid line and is coupled to an upper arm 16 of a suspension device via a ball joint 15. Although not shown in the figure, the lower part of the in-wheel motor drive device 13 is coupled to a lower arm of the suspension device.

The upper arm 16 has a V-shape. The upper arm 16 has its both ends located on the inner side in the lateral direction of the vehicle and coupled to a vehicle body 17 via pivots (not shown). The upper arm 16 has its middle bent portion located on the outer side in the lateral direction of the vehicle and coupled to the ball joint 15. The upper arm 16 can thus swing in the vertical direction with its both ends serving as a base end and its middle bent portion serving as a free end. This allows the in-wheel motor drive device 13 together with the wheel 10 to bound and rebound vertically.

A straight line connecting the joint portion between the lower arm (not shown) and the in-wheel motor drive device 13 and the ball joint 15 forms a steering axis K (also referred to as a kingpin). The in-wheel motor drive device 13 together with the wheel 10 can be steered about the steering axis K.

The in-wheel motor drive device 13 uses a three-phase brushless motor. The three-phase brushless motor includes a stator fixed to a housing and a rotor rotatably supported by the housing via a bearing. A stator coil (not shown) is disposed in the stator, and permanent magnets are disposed in the rotor. For example, the three-phase brushless motor need not necessarily be an interior permanent magnet synchronous motor, and may be a DC brushless motor. In order to apply a current to the stator coil, one ends of cables 18 are connected to the in-wheel motor drive device 13, as shown by dashed lines. The in-wheel motor drive device 13 is provided with a terminal box, not shown, and the one ends of the cables 18 are connected to the terminal box. A plurality of the cables 18 are provided. The other ends of the cables 18 are passed through a hole 19h formed in a vehicle body panel 19 and are connected to an inverter (not shown) mounted on the vehicle body 17 of the electric vehicle. The cables 18 include three power cables that supply electric power to the in-wheel motor drive device 13. The three power cables supply three-phase alternating currents, namely a U-phase current, a V-phase current, and a W-phase current. The cables 18 further include a single signal cable that transmits signals. When the in-wheel motor drive device 13 together with the wheel 10 bounds and rebounds in the vertical direction or is steered in the lateral direction, the relative positions between the in-wheel motor drive device 13 and the vehicle body 17 change accordingly, whereby the cables 18 are bent and stretched accordingly.

All of the four cables 18 are disposed so as to be bent approximately along the knuckle arm 14. The four cables 18 extend upward from the in-wheel motor drive device 13 and further upward so as to bypass the wheel 10, and then extend in the longitudinal direction of the vehicle and then inward in the lateral direction of the vehicle so as to be inserted into the vehicle body 17. The portions of the cables 18 which extend in the longitudinal direction of the vehicle are attached at their middle to the knuckle arm 14 by a clamp 33. The clamp 33 bundles all the cables 18 together and is coupled to the upper end of the knuckle arm 14. The cables 18 are thus held at such a position that the cables 18 cross the steering axis K of the in-wheel motor drive device 13.

Figure 2:
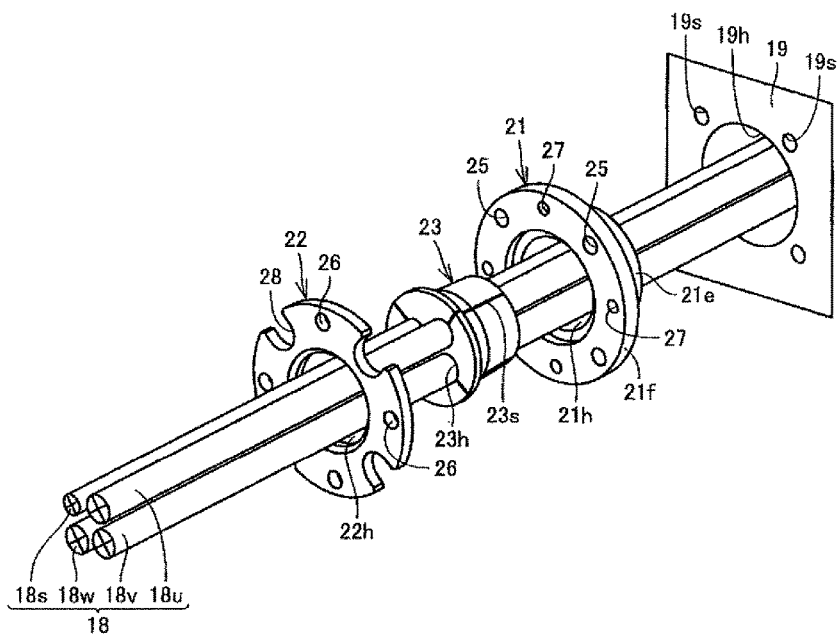
FIG. 2 is an exploded perspective view of a portion where cables are fixed according to the embodiment.
Figure 3:
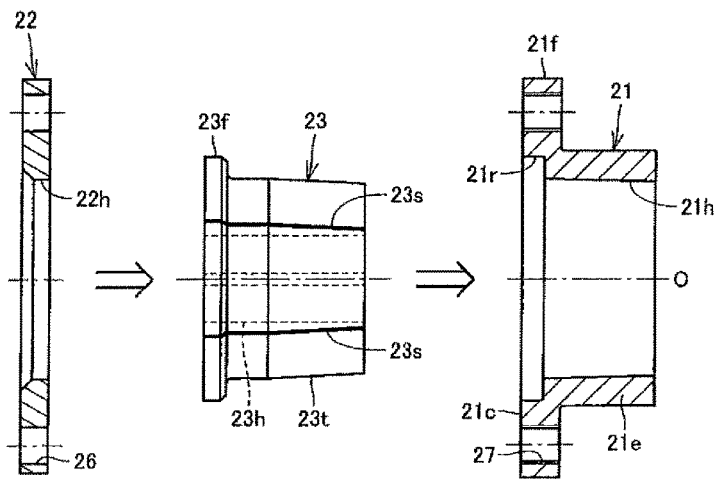
FIG. 3 is an exploded perspective view of a fixing portion and an elastic member according to the embodiment.

FIG. 2 is an exploded perspective view of a portion where the cables are fixed according to the present embodiment. FIG. 3 is an exploded sectional view of a fixing portion and an elastic member of the present embodiment. The cables 18 are held in the hole 19h of the vehicle body panel 19 by a fixing portion and an elastic member 23. The fixing portion is a portion that fixes the elastic member 23 to the vehicle body panel 19, and has a base part 21 and a fixing member 22. The base part 21 is formed by a cylindrical portion 21e and a flange portion 21f and has a substantially cylindrical shape with a circular first opening 21h in its center. The fixing member 22 is a circular plate having a circular second opening 22h in its center. The fixing member 22 is attached on top of the flange portion 21f. The base part 21 and the fixing member 22 are ring-shaped metal members. All the cables 18 are passed through both the first opening 21h and the second opening 22h. The base part 21 is fixed to the vehicle body panel 19 by an appropriate method such as with screws. For example, holes 25 are formed at regular intervals in the circumferential direction in the flange portion 21f of the base part 21 and screw holes 19s are formed at regular intervals in the circumferential direction around the hole 19h in the vehicle body panel 19. The cylindrical portion 21e of the base part 21 is inserted into the hole 19h. With the flange portion 21f being in contact with the vehicle body panel 19, screws (not shown) are inserted through the holes 25 and are screwed into the screw holes 19s. The base part 21 is thus fixed to the vehicle body panel 19, so that the first opening 21h of the base part 21 is aligned with the hole 19h of the vehicle body panel 19.

The elastic member 23 has a substantially columnar shape and has a plurality of through holes 23h extending in the axial direction of the column. The cables 18 are passed through the through holes 23h and the hole wall surfaces of the through holes 23h contact the outer peripheral surfaces of the cables 18. The elastic member 23 has slits 23s extending from the hole wall surfaces of the through holes 23h to the outer peripheral surface of the elastic member 23. The slits 23s are cuts formed in a radial pattern. As shown in FIG. 3, the elastic member 23 has a flange portion 23f formed at its one end so as to fit in a ring-shaped cutout 21r formed coaxially in an end face 21c of the base part 21 described below.

The base part 21 and the fixing member 22 of the fixing portion face each other in the axial direction O (the same as the direction in which the through holes 23h extend), and the elastic member 23 is inserted into the first opening 21h which is formed in the centers of the base part 21 and interposed between the base part 21 and the fixing member 22. The through holes 23h together with the first opening 21h of the base part 21 open at their one ends, and the through holes 23h together with the second opening 22h of the fixing member 22 open at their other ends. The base part 21 and the fixing member 22 fasten the elastic member 23 so as to clamp the elastic member 23 in the direction in which the through holes 23 extend.

The elastic member 23 together with the cables 18 is inserted into the first opening 21h of the base part 21. The flange portion 23f of the elastic member 23 is fitted in the cutout 21r of the base part 21, and the fixing member 22 is placed to cover the end face 21c of the base part 21. The fixing member 22 is thus attached and fixed to the base part 21. For example, such attachment and fixing of the fixing member 22 to the base part 21 is achieved by forming a plurality of holes 26 at predetermined intervals in the circumferential direction in the fixing member 22, forming a plurality of bolt holes 27 at predetermined intervals in the circumferential direction in the base part 21, and inserting bolts (not shown) through the holes 26 and screwing the bolts into the bolt holes 27. By attaching and fixing the fixing member 22 to the base part 21, the first opening 21h of the base part 21 and the second opening 22h of the fixing member 22 are aligned with each other. Since the outside diameter of the second opening 22h of the fixing member 22 is smaller than that of the flange portion 23f of the elastic member 23, the flange portion 23f is held between the cutout 21r and the fixing member 22. The elastic member 23 is thus fixed in the fixing portion so that the elastic member 23 cannot move.

As shown in FIG. 2, the fixing member 22 has cutouts 28 formed at regular intervals in the circumferential direction in its outer edge. With the fixing member 22 being attached and fixed to the base part 21, the cutouts 28 are in alignment with the holes 25 of the base part. The fixing member 22 thus does not close the holes 25, so that a work member can be moved closer to the holes 25 with the fixing member 22 being attached and fixed the base part 21. The screws described above can thus be turned with the work member to attach or detach the base part 21 to or from the vehicle body panel 19.

As shown in FIG. 3, in the present embodiment, the elastic member 23 has a tapered outer peripheral surface 23t, and the clamped elastic member 23 is pressed into the circular first opening 21h. The elastic member 23 is thus reduced in diameter in the first opening 21h due to the wedge action of the taper, and the through holes 23h are also reduced in diameter, whereby the hole wall surfaces of the through holes 23h press the outer peripheral surfaces of the cables 18. According to this embodiment, the elastic member 23 is subjected to the fastening force from the base part 21 and the fixing member 22 of the fixing portion to restrain the cables 18. The cables 18 can thus be held firmly. Moreover, even when the cables 18 are bent and stretched, the elastic member 23 is elastically deformed to allow the cables 18 to move slightly at their fixed positions. Accordingly, there is no risk that the cables 18 are repeatedly subjected to excessive bending stress at their fixed positions.

According to the present embodiment, the clamp 33 holds at least one of the cables 18 such that the at least one cable 18 crosses the steering axis K. Since a peripheral region including the steering axis K does not move so much according to steering, bending and stretching of the cables 18 can be minimized even when the in-wheel motor drive device 13 is steered in the left-turn direction or the right-turn direction.

According to the present embodiment, since the elastic member 23 has the slits 23s, the slits 23s can be opened to directly insert the intermediate portions of the cables 18 into the through holes 23h through the slits 23s. It is therefore not necessary to insert the ends of the cables 18 through the through holes 23h, whereby the cables 18 can be efficiently attached to the vehicle body 17.

As shown in FIG. 3, the first opening 21h of the base part 21 may be a tapered hole and the substantially columnar elastic member 23 may be pressed into the first opening 21h that is a tapered hole, so that the through holes 23h are reduced in diameter due to the wedge action to restrain the cables 18.

In the present embodiment, the elastic member 23 is placed in the cylindrical base part 21 and is pressed into the base part 21 with the fixing member 22 that is a ring-shaped plate. However, in a modification, not shown, the fixing member 22 may be formed in the shape of a claw. Alternatively, the fixing member 22 may have a cylindrical shape, the base part 21 may have a ring-shaped plate, and the elastic member 23 may be pressed into the fixing member 22 in a manner described above.

Figure 4:
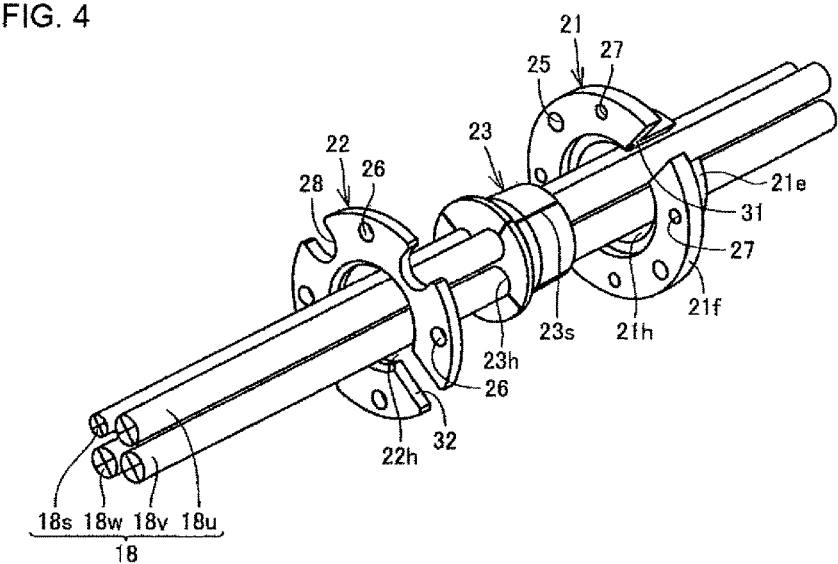
FIG. 4 is an exploded perspective view of a portion where cables are fixed according to a modification.

A modification of the present invention will be described below. FIG. 4 is an exploded perspective view of a modification of the present embodiment. In the modification of FIG. 4, the same configurations as those of the above embodiment are denoted with the same reference characters and description thereof will be omitted. The configurations different from those of the above embodiment will be described below. In the modification of FIG. 4, the base part 21 has a first cutout 31 extending from the first opening 21h to the outer edge of the base part 21. The fixing member 22 has a second cutout 32 extending from the second opening 22h to the outer edge of the fixing member 22. The base part 21 and the fixing member 22 therefore have a C-shape as viewed in the axial direction. In other words, the contours of the first opening 21h and the second opening 22c open at one position in the circumferential direction.

According to the modification of FIG. 4, since the fixing portion has the cutouts (the first cutout 31 and the second cutout 32), the intermediate portions of the cables 18 can be directly inserted into the through holes 23h through the cutouts. It is therefore not necessary to insert the ends of the cables 18 through the first opening 21h and the second opening 22h, whereby the cables 18 can be efficiently attached to the vehicle body 17.

As shown in FIG. 4, when attaching the fixing member 22 to the base part 21, the first cutout 31 and the second cutout 32 are preferably located at different positions as viewed in the axial direction. The fixing member 22 is thus attached and fixed to the base part 21 such that the first cutout 31 and the second cutout 32 are located at different positions as viewed in the direction in which the through holes 23h extend. The first cutout 31 is therefore not aligned with the second cutout 32 in the circumferential direction, whereby the contours of the first opening 21h and the second opening 22h are closed. This can avoid the risk that the cables 18 accidentally come off from the fixing portion through the slits 23s, the first cutout 31, and the second cutout 32.

Figure 5:
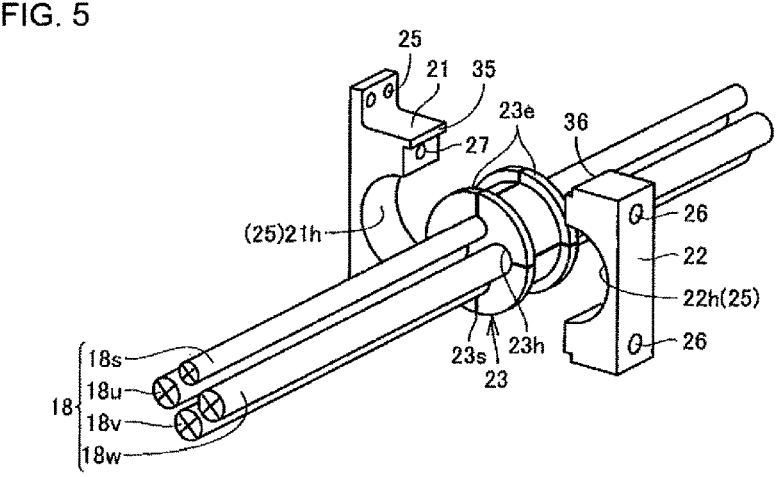
FIG. 5 is an exploded perspective view of a portion where cables are fixed according to another embodiment of the present invention.

Another embodiment of the present invention will be described below. FIG. 5 is an exploded perspective view of another embodiment of the present invention. In this embodiment, the same configurations as those of the above embodiment are denoted with the same reference characters and description thereof will be omitted. The configurations different from those of the above embodiment will be described below. In this embodiment, the base part 21 and the fixing member 22 have substantially the same shape and have half-moon-shaped openings 21h, 22h, respectively. By attaching and fixing the fixing member 22 to the base part 21, the half-moon-shaped openings 21h, 22h are combined to form a circular opening 25. The inside diameter of this circular opening 25 is smaller than the outside diameter of the elastic member 23. Accordingly, the elastic member 23 disposed in the circular opening 25 is clamped in the direction perpendicular to the axis by the base part 21 and the fixing member 22. The through holes 23h of the elastic member 23 extend parallel to the circular opening 25.

The mating surfaces of the base part 21 and the fixing member 22 have projections 35 and recesses 36, respectively. The projections 35 fit in the recesses 36, whereby the fixing member 22 is temporarily fixed to the base part 21. The fixing member 22 can thus be easily attached to the base part 21.

The elastic member 23 has flange-like brim portions 23e, 23e at its both ends. The base part 21 and the fixing member 22 are fitted between the brim portions 23e, 23e, whereby the elastic member 23 is retained so as not to come off from the base part 21 and the fixing member 22.

According to the embodiment of FIG. 5, the base part 21 and the fixing member 22 face each other in the direction perpendicular to the direction in which the through holes 23h extend, and clamp the elastic member 23 in the direction perpendicular to the direction in which the through holes 23h extend. The through holes 23h are thus reduced in diameter, so that the elastic member 23 presses the outer peripheral surfaces of the cables 18. The cables 18 can thus be restrained firmly. Moreover, even when the cables 18 are bent and stretched, the elastic member 23 is elastically deformed to allow such bending and stretching of the cables 18. Accordingly, there is no risk that the cables 18 are repeatedly subjected to bending stress in the elastic member 23.

Although the embodiments of the present invention are described above with reference to the figures, the present invention is not limited to the illustrated embodiments. Various changes and modifications can be made to the illustrated embodiments without departing from the spirit and scope of the invention.

INDUSTRIAL APPLICABILITY

The cable holding structure of the present invention is advantageously used in electric cars and hybrid vehicles.

REFERENCE SIGNS LIST

10 Wheel
11 Road Wheel
11c Wheel Hub
12 Tire
13 In-Wheel Motor Drive Device

14 Knuckle Arm
16 Upper Arm
17 Vehicle Body
18 Cable
19 Vehicle Body Panel
21 Base Part
21e Cylindrical Portion
21f Flange Portion
21h First Opening
22 Fixing Member
22h Second Opening
23 Elastic Member
23h Through Hole
23s Slit
23t Outer Peripheral Surface
25 Circular Opening
33 Clamp
K Steering Axis
O Axial Direction

The invention claimed is:

1. A cable holding structure, comprising:
a cable extending from a vehicle body-side member to an in-wheel motor drive device attached to the vehicle body-side member so that the in-wheel motor drive device can move relative to the vehicle body-side member;
an elastic member having a through hole through which the cable is passed; and
a fixing portion having an opening through which the cable is passed, and disposed on the vehicle body-side member and/or the in-wheel motor drive device to fasten the elastic member, wherein
the cable passed through the through hole is restrained by the elastic member subjected to a fastening force,
the fixing portion includes a base part having the opening and a fixing member attached and fixed to the base part,
the base part and the fixing member face each other in a direction in which the through hole extends, and clamp the elastic member in the direction in which the through hole extends,
one of the base part and the fixing member has a tapered hole that receives the elastic member, and
the elastic member has a columnar shape and is pressed into the tapered hole by the other of the base part and the fixing member,
the base part has a first cutout extending from the opening to an outer edge of the base part,
the fixing member has a second opening through which the cable is passed and a second cutout extending from the second opening to an outer edge of the fixing member, and
the fixing member is attached and fixed to the base part such that the first cutout and the second cutout are located at different positions and not aligned with each other as viewed in the direction in which the through hole extends.

2. The cable holding structure according to claim 1, wherein
the fixing portion includes a base part having the opening and a fixing member attached and fixed to the base part, and
the base part and the fixing member face each other in a direction perpendicular to a direction in which the through hole extends, and clamp the elastic member in the direction perpendicular to the direction in which the through hole extends.

3. The cable holding structure according to claim 1, wherein
one of the base part and the fixing member has a receiving hole that receives the elastic member, and
the elastic member has a tapered shape and is pressed into the receiving hole by the other of the base part and the fixing member.

4. The cable holding structure according to claim 1, wherein
the elastic member has a slit extending from a hole wall surface of the through hole to a surface of the elastic member.

5. The cable holding structure according to claim 1, wherein
the vehicle body-side member includes a suspension device that allows the in-wheel motor drive device to be steered, the cable holding structure further comprising:
a clamp that holds the cable such that the cable crosses a steering axis of the in-wheel motor drive device.

* * * * *